United States Patent
Akahori

(10) Patent No.: US 11,093,030 B2
(45) Date of Patent: Aug. 17, 2021

(54) OPERATION DETERMINATION DEVICE AND OPERATION DETERMINATION METHOD

(71) Applicant: LAPIS Semiconductor Co., Ltd., Yokohama (JP)

(72) Inventor: Hiroji Akahori, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/282,913

(22) Filed: Feb. 22, 2019

(65) Prior Publication Data
US 2019/0265784 A1 Aug. 29, 2019

(30) Foreign Application Priority Data
Feb. 23, 2018 (JP) .............................. JP2018-030878

(51) Int. Cl.
*G06T 7/13* (2017.01)
*G06T 7/70* (2017.01)
(Continued)

(52) U.S. Cl.
CPC ............ *G06F 3/012* (2013.01); *A63F 13/213* (2014.09); *A63F 13/40* (2014.09); *G06F 3/013* (2013.01);
(Continued)

(58) Field of Classification Search
CPC .......... G06F 3/013; G06F 3/012; G06F 3/011; G06F 3/167; G06F 3/0304; G06F 3/017; G06F 3/04842; G06K 9/00604; G06K 9/00335; G06K 9/00248; G06K 9/0061; G06K 9/00268; G06K 2209/21; G06K 9/0248; G06K 9/4604; G06K 9/2054;
(Continued)

(56) References Cited

U.S. PATENT DOCUMENTS 5,933,527 A * 8/1999 Ishikawa ............ G06K 9/00268
382/118
8,982,229 B2 * 3/2015 Suzuki .................... G06T 19/20
348/222.1

(Continued)

FOREIGN PATENT DOCUMENTS

JP 2005-352580 A 12/2005

*Primary Examiner* — Dismery Mercedes
(74) *Attorney, Agent, or Firm* — Rabin & Berdo, P.C.

(57) ABSTRACT

An operation determination device that determines a change in the facing direction of a user's face as a contact-free operation on a display image includes an image acquisition unit that acquires a captured image that is captured of the user's face and an image processing unit that performs image processing on the captured image and detects the direction of the user's face. The image processing unit includes a first processing unit that detects a portion of the user's face in the captured image and a second processing unit that determines the direction of the user's face in relation to a display surface that displays the display image, on the basis of the portion of the user's face detected in the captured image. The first processing unit includes hardware that executes specific detection processes, and the second processing unit includes one or more processors executing software that execute processes according to output from the first processing unit.

17 Claims, 9 Drawing Sheets

(51) Int. Cl.
- *G06F 3/01* (2006.01)
- *G06K 9/00* (2006.01)
- *G06K 9/46* (2006.01)
- *A63F 13/213* (2014.01)
- *A63F 13/40* (2014.01)
- *H04N 13/383* (2018.01)
- *G06T 7/73* (2017.01)

(52) U.S. Cl.
CPC ....... *G06K 9/0061* (2013.01); *G06K 9/00248* (2013.01); *G06K 9/00268* (2013.01); *G06K 9/00604* (2013.01); *G06K 9/4604* (2013.01); *G06T 7/13* (2017.01); *G06T 7/70* (2017.01); *G06T 7/73* (2017.01); *H04N 13/383* (2018.05); *A63F 2300/1087* (2013.01); *G06T 2207/30201* (2013.01)

(58) Field of Classification Search
CPC ............ G02B 27/0172; G02B 27/0093; G02B 2027/0138; G06T 2207/30201; G06T 7/70; G06T 13/40; G06T 7/73; G06T 7/13; A61B 3/0025; H04N 13/128; H04N 13/383; H04N 13/183; G09G 2354/00
See application file for complete search history.

(56) References Cited

U.S. PATENT DOCUMENTS

| | | | |
|---|---|---|---|
| 9,280,204 B2* | 3/2016 | Kim | G06F 1/3231 |
| 9,473,696 B2* | 10/2016 | Kamimura | H04N 5/23219 |
| 10,186,057 B2* | 1/2019 | Shimura | G06K 9/00355 |
| 10,198,622 B2* | 2/2019 | Anzue | G06F 3/012 |
| 2012/0081568 A1* | 4/2012 | Suzuki | H04N 13/275 348/222.1 |
| 2013/0070973 A1* | 3/2013 | Saito | G06K 9/00228 382/118 |
| 2013/0257723 A1* | 10/2013 | Sawada | G06F 3/04845 345/158 |
| 2015/0206354 A1* | 7/2015 | Shibuhisa | G06K 9/6255 348/46 |
| 2016/0026342 A1* | 1/2016 | Cohen | G06F 3/04815 715/821 |
| 2016/0195926 A1* | 7/2016 | Imoto | G06F 3/013 382/103 |
| 2017/0236304 A1* | 8/2017 | Kempinski | G06F 3/013 382/117 |
| 2017/0351327 A1* | 12/2017 | Yasuda | G06F 3/038 |
| 2018/0143432 A1* | 5/2018 | Li | G06F 3/013 |
| 2019/0340780 A1* | 11/2019 | Hiraide | G06T 7/00 |

* cited by examiner

OPERATION DETERMINATION DEVICE AND OPERATION DETERMINATION METHOD

TECHNICAL FIELD

The present invention relates to an operation determination device and an operation determination method.

BACKGROUND ART

In recent years, devices that are used in gaming devices or the like, and that are provided with the function of detecting the gaze of the user and displaying a pointer or a cursor indicating the gaze position of the user on the screen are being developed. The user can perform operations and the like on gaming devices by shifting the gaze direction.

However, if the gaze of the user is used for operation, then the cursor or the like moves along with movement of the gaze, and thus, when performing the operation, the user cannot look at anything other than the operation target, and in order to view anything other than the operation target, the user must interrupt operation of the target. In order to handle this issue, devices in which the cursor moves according to the movement of the user's head as opposed to the gaze direction of the user have been proposed (see Japanese Patent Application Laid-Open Publication No. 2005-352580, for example).

SUMMARY OF THE INVENTION

In order to detect movement of the head, image processing is performed on a captured image of the user's face, the position of the portion of the face to be the target is detected, and a process of converting the detected position to two-dimensional position coordinates is performed, for example. These processes have complex steps and require a lot of calculations to be performed. Thus, if the processes were to be performed by software, it would require a lot of processing time and would entail high power consumption.

The present invention takes into consideration the above problem, and an object thereof is to provide an operation determination device that can perform contact-free operation determination based on changes in the direction of the face at high speed and with low power consumption.

An operation determination device of the present invention determines a change in a direction of a face of a user as a contact-free operation on a display image, the operation determination device having: an image acquisition unit that acquires a captured image that is captured of the face of the user; and an image processing unit that performs image processing on the captured image and detects the direction of the face of the user, wherein the image processing unit includes: a first processing unit that detects a portion of the face of the user in the captured image; and a second processing unit that determines the direction of the face of the user in relation to a display surface that displays the display image, on the basis of the portion of the face of the user detected in the captured image, and wherein the first processing unit is constituted of hardware that executes specific detection processes, and the second processing unit is constituted of software that executes processes according to output from the first processing unit.

Also, an operation determination method of the present invention is to be performed in an operation determination device that determines a change in a direction of a face of a user as a contact-free operation on a display image, the method including: a step of acquiring a captured image that is captured of the face of the user; a step of detecting a portion of the face of the user in the captured image using hardware that executes specific detection processes; and a step of determining by software the direction of the face of the user in relation to a display surface that displays the display image, on the basis of the portion of the face of the user detected in the captured image:

According to the operation determination device of the present invention, it is possible to perform contact-free operation determination based on changes in the direction of the face at high speed and with low power consumption.

DETAILED DESCRIPTION OF EMBODIMENTS

Figure 1:
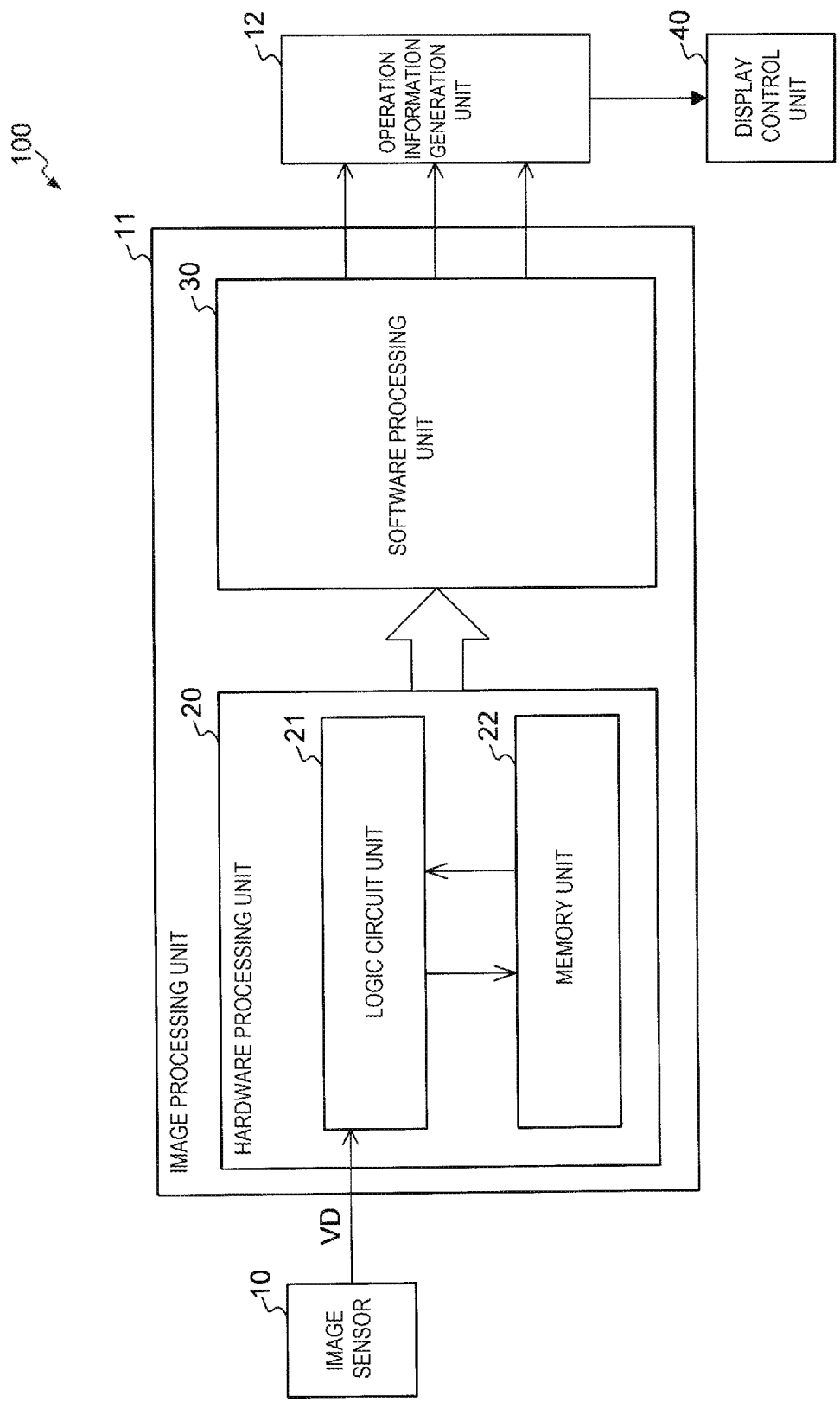
FIG. 1 is a block diagram showing a configuration of a motion operation device of the present embodiment.

Embodiments of the present invention will be explained below with reference to the drawings. In the description of embodiments and the affixed drawings below, parts that are substantially the same or equivalent are assigned the same reference characters.

Embodiment 1

A motion operation device 100 of the present embodiment is provided in a device (such as a gaming device) that displays an image on a display and controls the display to perform certain operations based on motion of a user who views the image. The motion operation device 100, which may also be referred to as an operation determination device, determines changes in the direction of the user's face so that the changes in the direction of the user's face allow the user to interact with and alter the display image in a contact-free manner. Specifically, the motion operation device 100 detects the direction of the user's face and/or eyes on the basis of an image captured of the user's face, and performs image processing and determination processing in order to display a cursor or a pointer (hereinafter referred to as the "cursor or the like") at a position on the screen corresponding to the detected direction of the face and/or eyes.

FIG. 1 is a block diagram showing a configuration of a motion operation device 100 of the present embodiment. The motion operation device 100 has an image sensor 10, an image processing unit 11, and an operation information generation unit 12. The operation information generation unit 12 is connected to a display control unit 40 that performs display control of the display.

The image sensor 10 is provided in a camera disposed in the vicinity of the display, for example, and is an imaging element that generates an image captured of the user's face. The image sensor 10 supplies image data VD, which is the captured image acquired by imaging performed by the camera, to the image processing unit 11.

Figure 2:
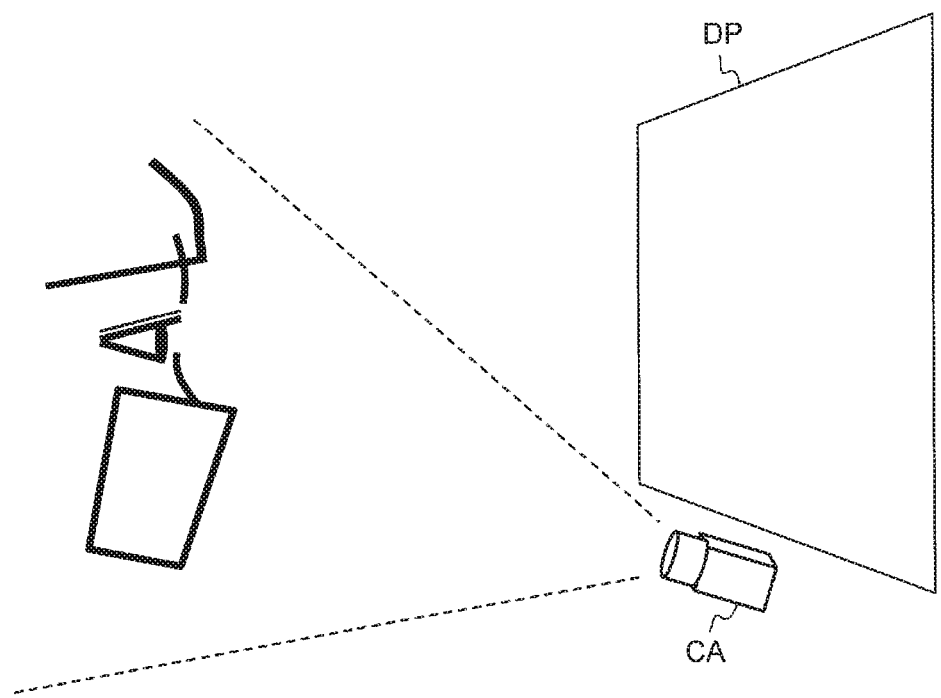
FIG. 2 is a schematic view of the arrangement of a camera, the position of a display, and the position of the user's face in the present embodiment.

FIG. 2 shows the positional relationship between the camera CA equipped with the image sensor 10, the display DP, and the user. The camera CA equipped with the image sensor 10 is disposed at a position to the front and below the display DP as seen by the user, for example.

The camera CA images the user's face, and acquires a facial image of the user including at least the contour portion surrounding the eyes. The motion operation device 100 of the present embodiment detects the direction of the face and determines the operation on the basis of the contour portion surrounding the eyes included in the facial image acquired by the camera CA. Thus, the motion operation device 100 of the present embodiment is configured so as enable operation determination even if the user is wearing a mask, a hat, or the like, as shown in FIG. 2.

Returning to FIG. 1, the image processing unit 11 is constituted of a hardware processing unit 20 and a software processing unit 30. The hardware processing unit 20 is constituted of specialized hardware that performs specific processes (i.e. non-programmable processes), and includes a logic circuit unit 21 and a memory unit 22. The software processing unit 30 is a processing unit that is constituted of a CPU (central processing unit) and the like, and performs processes according to programs.

Figure 3:
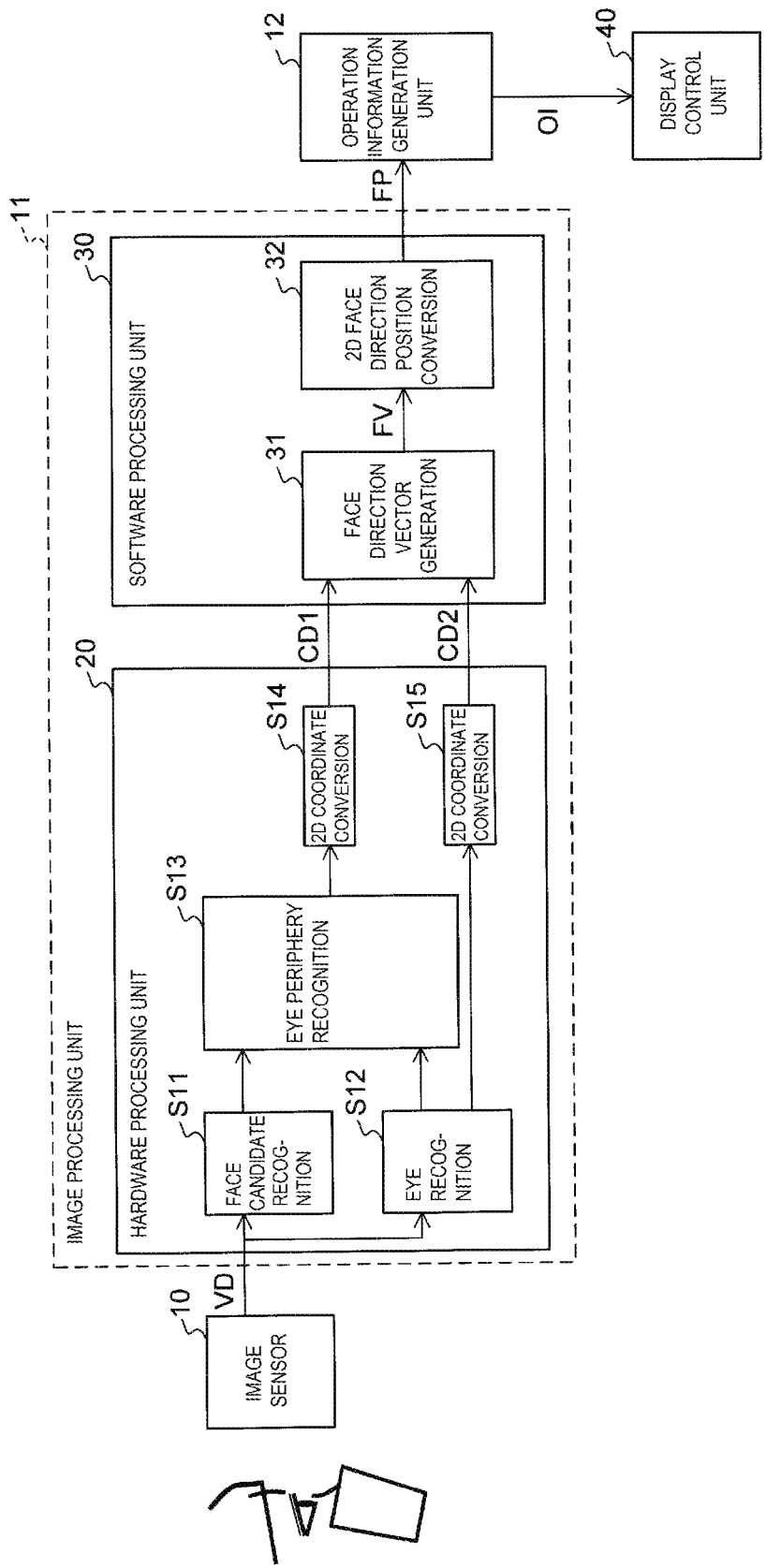
FIG. 3 is a block diagram showing a process block and a functional block of an image processing unit of the motion operation device of the present embodiment.

FIG. 3 is a block diagram showing processing blocks for processes executed by the hardware processing unit 20, and functional blocks formed by the software processing unit 30 by execution of prescribed programs.

The hardware processing unit 20 performs a process of detecting, on the basis of image data VD supplied by the image sensor 10, the position of the user's face in a captured image that was captured by the camera CA (hereinafter referred to as face detection process). The face detection process includes a face candidate recognition process (S11), an eye recognition process (S12), an eye periphery recognition process (S13), an eye periphery 2D coordinate conversion process (S14), and an eye 2D coordinate conversion process (S15).

The hardware processing unit 20 performs a face candidate recognition process (S11) for detecting a region where it is estimated that the user's face is present (hereinafter referred to as a "face candidate") within a two-dimensional image formed by putting the image data VD on a two-dimensional coordinate space on the basis of the image data VD supplied from the image sensor 10, and extracting an image of the face candidate. In the face candidate recognition process, the face candidate of a user is detected by detecting a flesh-colored region in the two-dimensional image, for example.

Also, the hardware processing unit 20 performs the eye recognition process (S12) for detecting the user's eyes in the two-dimensional image and extracting an image of the eyes. In the eye recognition process, the user's eyes are detected by detecting a white region and a dark region (that is, the whites and irises/pupils of the eyes) within the flesh-colored region in the two-dimensional image, for example.

The hardware processing unit 20 performs an eye periphery recognition process (S13) for detecting the contour of the area surrounding the eyes and extracting an image thereof on the basis of the face candidate detected in the face candidate recognition process (S11) and the pupils of the eyes detected in the eye detection process (S12). In the eye periphery recognition process, in detecting the contour of the periphery of the eyes, the frame portions of the eyes excluding the pupils and eyeballs (hereinafter referred to as the "edge of the eye"), the brow, the temple, and both edges of the face to the side of the eyes (same height as eyes; hereinafter referred to as side edges of the face) are detected, for example. Also, the hardware processing unit 20 performs the eye periphery 2D coordinate conversion process in which the various portions of the face constituting the contour surrounding the eyes (hereinafter referred to as the eye periphery) are represented as positions in a two-dimensional coordinate plane (S14), and an eye 2D coordinate conversion process that represents the positions of the pupils of the eyes in a two-dimensional coordinate plane (S15). In one embodiment, only the eye periphery portion of the face is detected or analyzed, and the remaining portions of the face are not detected or analyzed.

Figure 4:
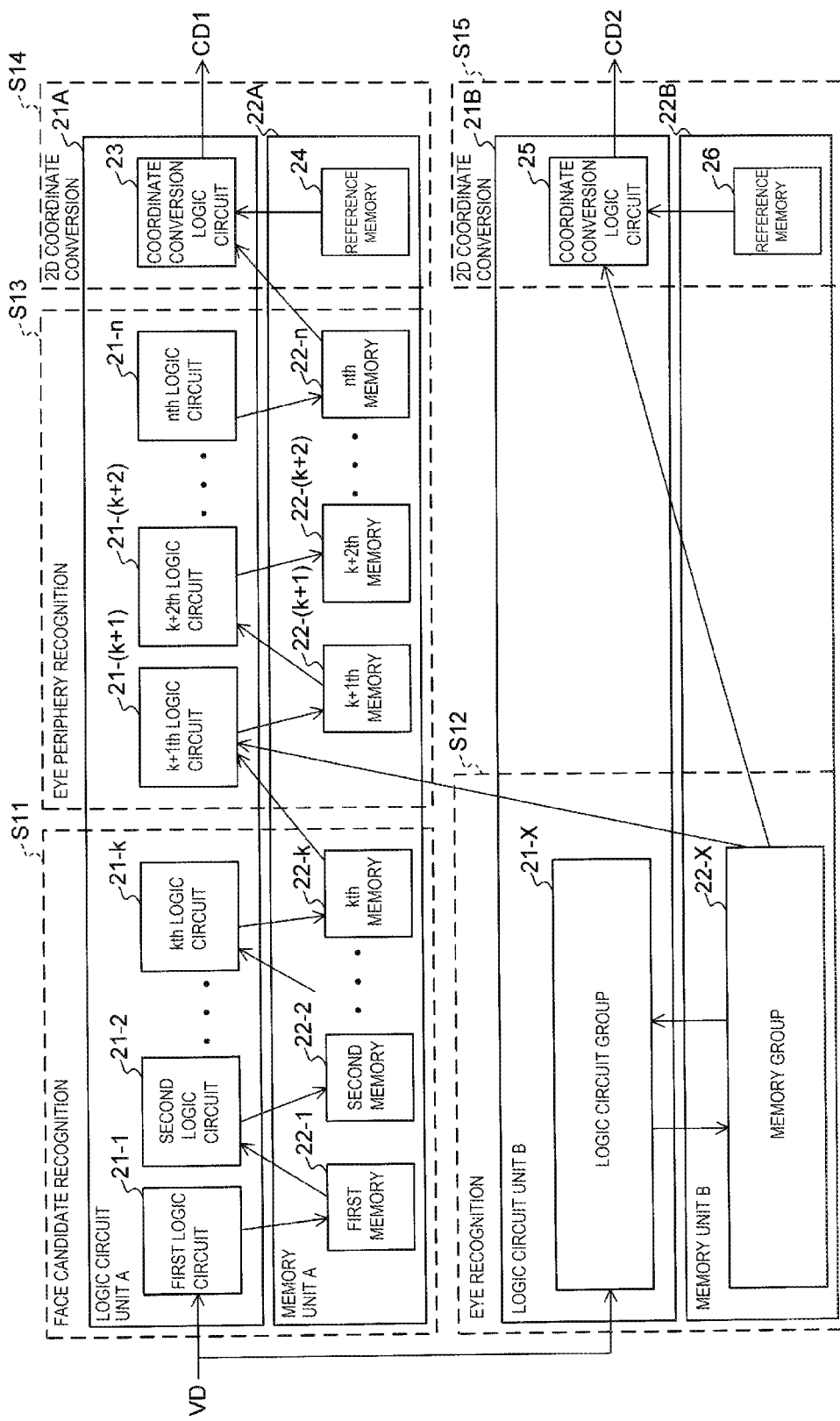
FIG. 4 is a block diagram showing a portion of the configuration of a hardware processing unit.

FIG. 4 is a block diagram that schematically shows the configuration of the logic circuit unit 21 and the memory unit 22, and the process flow for executing the series of processes including the face candidate recognition process (S11), the eye recognition process (S12), the eye periphery recognition process (S13), the eye periphery 2D coordinate conversion process (S14), and the eye 2D coordinate conversion process (S15).

The logic circuit unit 21 is constituted of a logic circuit unit A (indicated as 21A in FIG. 4) and a logic circuit unit B (indicated as 21B in FIG. 4). The memory unit 22 is constituted of a memory unit A (indicated as 22A in FIG. 4) and a memory unit B (indicated as 22B in FIG. 4).

The logic circuit unit A (21A) includes a logic circuit group constituted of a first logic circuit 21-1, a second logic circuit 21-2, . . . and an nth logic circuit 21-$n$ ($n$ being an integer of 2 or greater); and a coordinate conversion logic circuit 23. The memory unit A (22A) includes a memory group constituted of a first memory 22-1, a second memory 22-2, . . . and an nth memory 22-$n$; and a reference memory 24. The first memory 22-1 to 22-$n$ has written thereto data of results of operations by the first logic circuit 21-1 to the nth logic circuit 21-$n$. On the other hand, the reference memory 24 is a memory that stores coordinate plane information, for example, and data from the first logic circuit 21-1 to the nth logic circuit 21-$n$ is not written thereto.

The first logic circuit 21-1 to the kth logic circuit 21-$k$ (k being a natural number less than n) execute the face coordinate recognition process (S11) using the first memory 21-1 to kth memory 22-$k$. In such a case, the first logic circuit 21-1 to kth logic circuit 21-$k$ perform a prescribed matrix operation for each dot (pixel) so as to scan the entire two-dimensional image, for example, and detect the contour of a region of the face candidate.

Figure 5A:
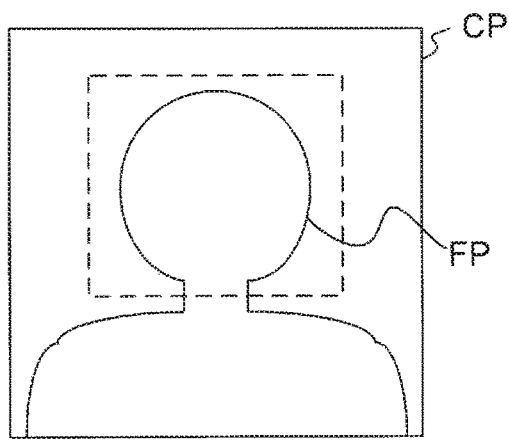
FIG. 5A schematically shows a state in which an image of a face candidate is extracted from a two-dimensional image.

During the face candidate recognition process (S11), the first logic circuit 21-1 performs a matrix operation on the image data VD, and stores the operation result data in the first memory 22-1. The second logic circuit 21-2 performs a matrix operation on the data read from the first memory 22-1, and stores the operation result data in the second memory 22-2. Thereafter, a similar process is performed up to the kth logic circuit 21-$k$, and image data indicating final operation results of the face candidate recognition process is stored in the kth memory 22-$k$. As a result, as shown in FIG. 5A, an image FP of the face candidate is extracted from the two-dimensional image CP.

The logic circuit unit B (21B) includes a logic circuit group 21-X constituted of a plurality of logic circuits similar to the first logic circuit 21-1 to the kth logic circuit 21-$k$, and a coordinate conversion logic circuit 25. The memory unit B (22B) includes a memory group 22-X constituted of a plurality of memories similar to the first memory 22-1 to kth memory 22-$k$, and a reference memory 26. The memory group 22-X has written thereto data of operation results by the logic circuits constituting the logic circuit group 21-X. On the other hand, the reference memory 26 is a memory that stores coordinate plane information, for example, and data from the logic circuits is not written thereto.

Figure 5B:
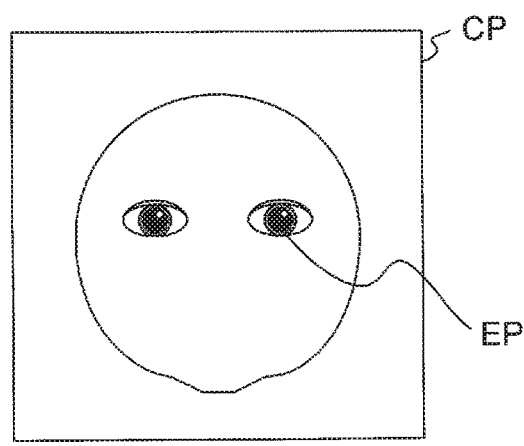
FIG. 5B schematically shows an image of eyes in the two-dimensional image.

The logic circuit group 21-X and the memory group 22-X execute the eye recognition process (S12). Specifically, the logic circuits constituting the logic circuit group 21-X repeatedly store and read operation results in/from the memories corresponding to the memory group 22-X and sequentially perform matrix operations, similar to the first logic circuit 21-1 to kth logic circuit 21-$k$ during the face candidate recognition process (S11). As a result, an image EP of the eyes such as shown in FIG. 5B is extracted from the two-dimensional image CP.

The k+1th logic circuit 21-($k$+1) to the nth logic circuit 21-$n$ of the logic circuit unit A (21A) execute the eye periphery recognition process (S13) using the k+1th memory 22-($k$+1) to the nth memory 22-$n$. The k+1th logic circuit 21-($k$+1) to the nth logic circuit 21-$n$ perform a prescribed matrix operation on each dot (pixel) so as to scan the entire image on the basis of the image FP of the face candidate extracted during the face candidate recognition process (S11) and the image EP of the eyes extracted during the eye recognition process (S12), and detect the eye periphery (edges of the eyes, brow, temples, and side edges of face).

During the eye periphery recognition process (S13), the k+1th logic circuit 21-($k$+1) reads the image data of the image FP of the face candidate from the kth memory 22-$k$, reads the image data of the image EP of the eyes from the memories of the memory group 22-X, performs a matrix operation on both pieces of image data, and stores the operation result data in the k+1th memory 22-($k$+1). The k+2th logic circuit 21-($k$+2) performs a matrix operation on the data read from the k+1th memory 22-($k$+1), and stores the operation result data in the k+2th memory 22-($k$+2). Thereafter, a similar process is performed up to the nth logic circuit 21-$n$ and final operation results are stored in the nth memory 22-$n$.

Figure 5C:
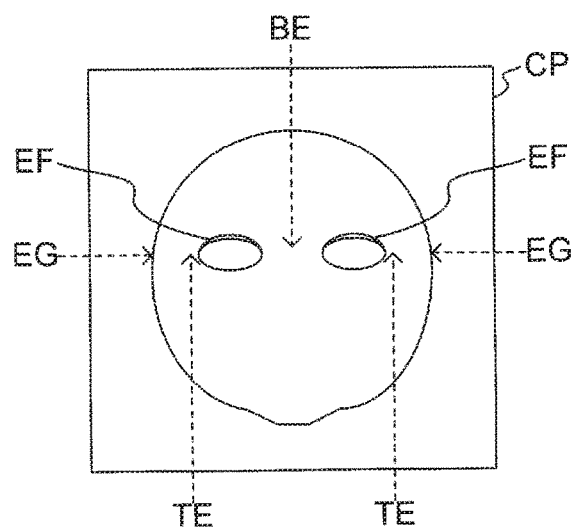
FIG. 5C schematically shows positions of an eye periphery in the two-dimensional image.

FIG. 5C schematically shows an eye periphery detected during the eye periphery recognition process (S13). The edge portions of the eyes are detected as the eye edges EF, and the portion between the eyes is detected as the brow BE. The vicinity of the outer corners of the eyes are detected as temples TE, and the boundaries between the flesh-colored portions to the sides of the eyes and the background are detected as facial side edges EG.

Returning to FIG. 4, the coordinate conversion logic circuit 23 executes the eye periphery 2D coordinate conversion process (S14) using the nth memory 22-$n$ and the reference memory 24. The coordinate conversion logic circuit 23 reads image data of the eye periphery (eye edges, brow, temples, and facial side edges) from the nth memory 22-$n$, and generates coordinate position information CD1 indicating the positions of the eye periphery in a two-dimensional coordinate plane on the basis of coordinate plane information stored in the reference memory 24.

Also, the coordinate conversion logic circuit 25 executes the eye 2D coordinate conversion process (S15) using the memories of the memory group 22-X and the reference memory 26. The coordinate conversion logic circuit 25 reads image data EP of the eyes from the last memory in the memory group 22-X, and generates coordinate position information CD2 indicating the positions of the eyes in a two-dimensional coordinate plane on the basis of coordinate plane information stored in the reference memory 26.

In some cases, a plurality of persons are present within the imaging range of the camera CA (that is, in front of the display DP). In such a case, the hardware processing unit 20 executes the above-mentioned processes (face candidate recognition process (S11), eye recognition process (S12), eye periphery recognition process (S13), eye periphery 2D coordinate conversion process (S14), and eye 2D coordinate conversion process (S15)) for each of the plurality of persons on the basis of the image of the plurality of persons in the captured image, and generates the coordinate position information CD1 of the eye periphery and the coordinate position information CD2 of the eyes for each of the plurality of persons.

Returning to FIG. 3, the software processing unit 30 executes a face direction determination process to determine which position in the screen of the display DP the user's face is facing on the basis of the coordinate position information CD1 and CD2 supplied from the hardware processing unit 20.

The software processing unit 30 has formed therein a face direction vector generation unit 31 and a 2D face direction position conversion unit 32 as functional blocks by the CPU executing prescribed programs.

The face direction vector generation unit 31 generates a face direction vector FV indicating the direction of the portion of the face in the periphery of the eyes excluding the pupils of the user, on the basis of the coordinate information CD1 of the eye periphery and the coordinate information CD2 of the eyes based on the image data VD. If coordinate position information CD1 and CD2 for a plurality of persons is fed from the hardware processing unit 20, the face direction vector generation unit 31 generates face direction vectors FV for the plurality of persons.

The 2D face direction position conversion unit 32 measures (estimates) the distance from the display DP to the user on the basis of the coordinate information CD1 of the eye periphery and the coordinate information CD2 of the eyes. The 2D face direction position conversion unit 32 estimates the size of the user's face on the basis of the distance between the pupils of the eyes and the distance between the edges of the eyes, for example. Then, the 2D face direction position conversion unit 32 calculates the distance from the camera CA to the user's face on the basis of the size of the user's face and uses this value as an estimate of the distance from the display DP to the user's face.

The 2D face direction position conversion unit 32 converts the position that the user's face is facing into a two-dimensional position on the screen of the display DP on the basis of the estimated distance and the face direction vector FV generated by the face direction vector generation unit 31, and generates face direction position information FP indicating the position on the display screen that the face is facing. The 2D face direction position conversion unit 32 feeds the face direction position information FP to the operation information generation unit 12. If a plurality of persons are present in the imaging range of the camera CA, the 2D face direction position conversion unit 32 generates the face direction position information FP for the plurality of persons and feeds it to the operation information generation unit 12.

The operation information generation unit 12 generates operation information OI for displaying a cursor or the like in a position on the screen corresponding to the direction of the user's face on the basis of the face direction position information FP, and feeds the operation information to a display control device (not shown) that performs display control of the display DP.

In generating and feeding the operation information OI, the operation information generation unit 12 identifies a person performing an operation to move a cursor or the like by changing the direction of their face (hereinafter referred to simply as an "operation") and executes an operation target selection process for limiting the operable range. In the motion operation device 100 of the present embodiment, a prescribed distance range from the display DP, for example, is set in advance as a reference to set the operable range, according to the screen size of the display DP, the position of the camera CA, or the like.

Figure 6:
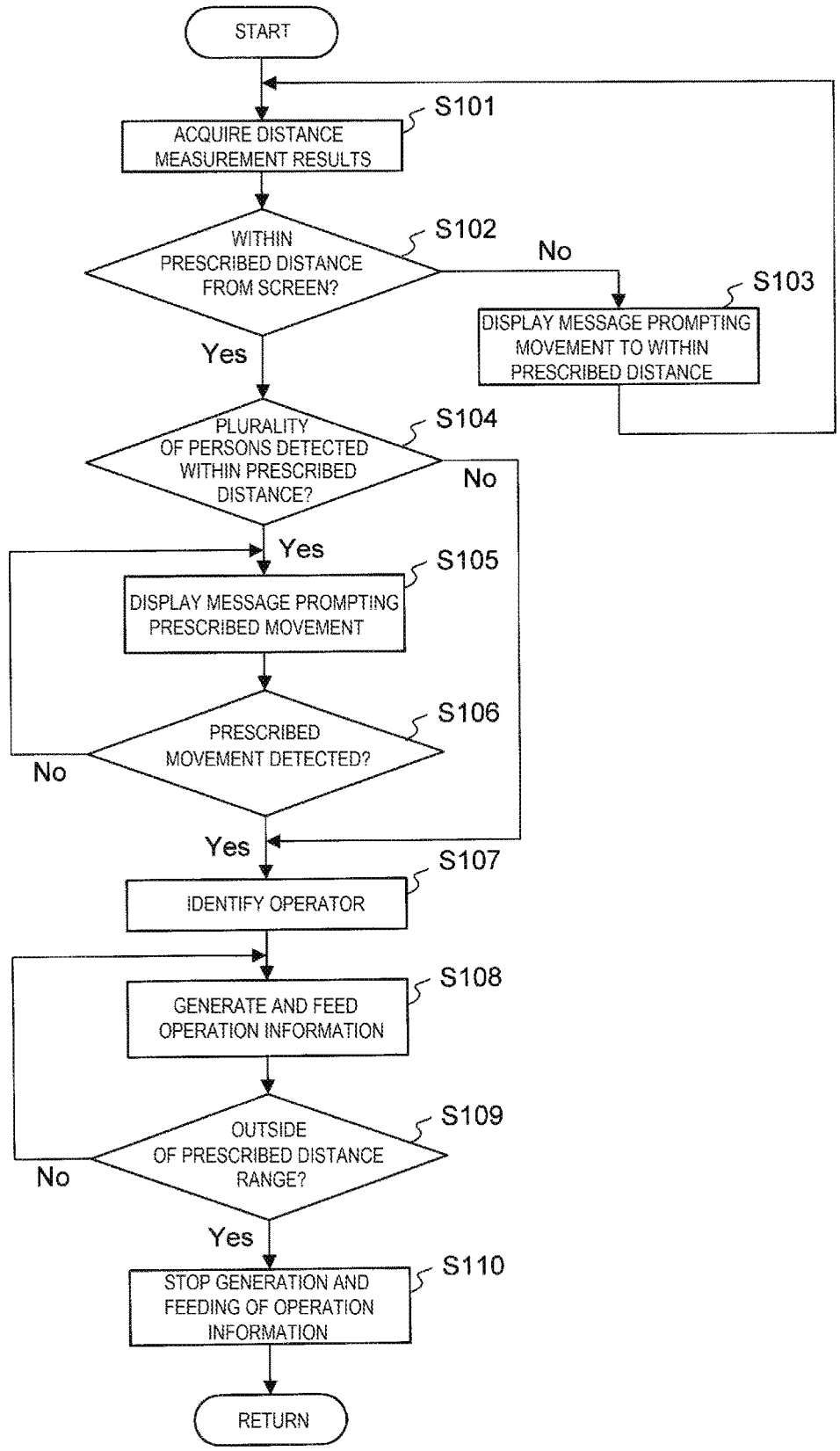
FIG. 6 is a flowchart showing a processing routine for an operation target selection process.

FIG. 6 is a flowchart showing a processing routine for an operation target selection process executed by the operation information generation unit 12.

The operation information generation unit 12 acquires measurement results of the distance from the user's face, which was measured (estimated) by the 2D face direction position conversion unit 32 of the software processing unit 30, to the display DP.

The operation information generation unit 12 determines whether or not the user's face is within a prescribed distance range from the screen of the display DP on the basis of the acquired distance measurement results (step S102).

If it is determined that the user's face is not within the prescribed distance range (step S102: No), then the operation information generation unit 12 controls the display control unit 40 to cause a message prompting movement into the prescribed distance range to be displayed in the screen of the display DP (step S103) and waits for new distance measurement results to be acquired.

If it is determined that the face is within the prescribed distance range from the screen (step S102: Yes), then the operation information generation unit 12 determines whether or not a plurality of persons' faces are present within the prescribed distance range (step S104).

If it is determined that a plurality of persons' faces are not present in the prescribed distance range, or in other words, that the face of only one person is present (step S104: No), then the operation information generation unit 12 identifies the person as the operator (step S107).

On the other hand, if it is determined that a plurality of persons' faces are present within the prescribed distance range (step S104: Yes), then the operation information generation unit 12 controls the display control unit 40 to display, in the screen of the display DP, a message prompting the person attempting to perform operations using the motion operation device 100 of the present embodiment to perform a prescribed movement (such as shaking the head left and right, for example) (step S105).

The operation information generation unit 12 determines whether or not a prescribed movement was detected on the basis of the face direction position information FP fed from the software unit 30 (step S106). If it is determined that the prescribed movement was not detected (step S106: No), the operation information generation unit 12 controls the display control unit 40 to continue to display the message prompting the prescribed movement.

If it is determined that the prescribed movement was detected (step S106: Yes), then the operation information generation unit 12 identifies the person who performed the prescribed movement as the operator (step S107).

The operation information generation unit 12 generates the operation information OI for the operator on the basis of the face direction position information FP fed from the image processing unit 11 and feeds the operation information to the display control unit 40 (step S108).

The operation information generation unit 12 determines whether or not the position of the operator's face is outside of the prescribed distance range on the basis of the measurement results of the distance from the user's face, which was measured (estimated) by the 2D face direction position conversion unit 32, to the display DP. If it is determined that the operator's face is not outside of the range (step S109: No), then generation and feeding of the operation information OI continues.

If it is determined that the position of the operator's face is outside of the prescribed distance range (step S109: Yes), then the operation information generation unit 12 stops generation of the operation information OI and feeding thereof to the display control unit 40 for the operator (step S110). Thus, operations outside of the prescribed distance range are treated as invalid operations.

By the above operations performed by the hardware processing unit 20, the software processing unit 30, and the operation information generation unit 12, the operation information OI indicating the direction of the user's face is fed to the display control unit 40, and changes in the direction of the user's face are determined as a contact-free operation on the display image (movement of the cursor or the like, for example).

In the motion operation device 100 of the present embodiment, the hardware processing unit 20, which is constituted of specialized hardware that executes only specific detection processes, executes the face detection process, which includes the face candidate recognition process, the eye recognition process, the eye periphery recognition process, and the 2D coordinate conversion process. These processes include processes and the like in which matrix operations are repeated for each pixel so as to scan the entire two-dimensional image, and thus, there are many process steps as compared to subsequent processes (generation of face direction vector and 2D position conversion of face direction).

If, unlike the present embodiment, the face detection process were to be performed using software, then the CPU would access the same memory for each process performed, which would lengthen the processing time. By contrast, in the motion operation device 100 of the present embodiment, the hardware processing unit 20 performs these processes using logic circuits that execute existing matrix operation processes and memories that store data for the matrix operation processes, and thus, the processes can be performed in a relatively short period of time (in other words, quickly). As a result of shortening the processing time, power consumption is reduced.

Thus, according to the motion operation device 100 of the present embodiment, it is possible to perform operation determination based on the direction of the user's face at high speed and with low power consumption.

Also, the motion operation device 100 of the present embodiment detects the direction of the face on the basis of the portions constituting the contour surrounding the eyes such as the edges of the eyes, the brow, the temples, and the side edges of the face, or in other words, the portions of the face surrounding the eyes other than the pupils, and displays a cursor or the like at a position on the display screen based on the direction of the face. Thus, operations can be made by changing the direction of the face regardless of the gaze direction of the eyes themselves, and thus, the user can perform operations while viewing objects other than those to be operated. In other words, according to one embodiment, the motion operation device 100 detects the direction of the portion of the face only immediately surrounding the eyes (such as edges of eyes, brow, temples, and sides of face by eyes), while excluding the eyes themselves and excluding portions of the face that are not immediately surrounding the eyes (such as the tip of the nose near the mouth, the mouth, the chin, and the upper forehead), to interact with a display.

Figure 7A:
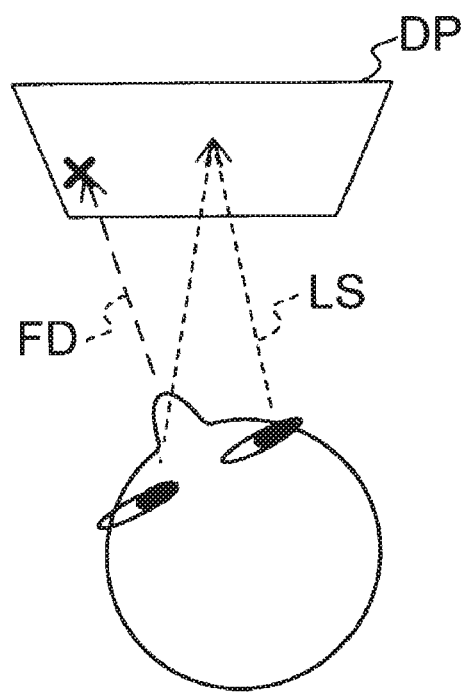
FIG. 7A schematically shows the relationship between the gaze direction of the user, the direction of the user's face, and the position of the display.
Figure 7B:
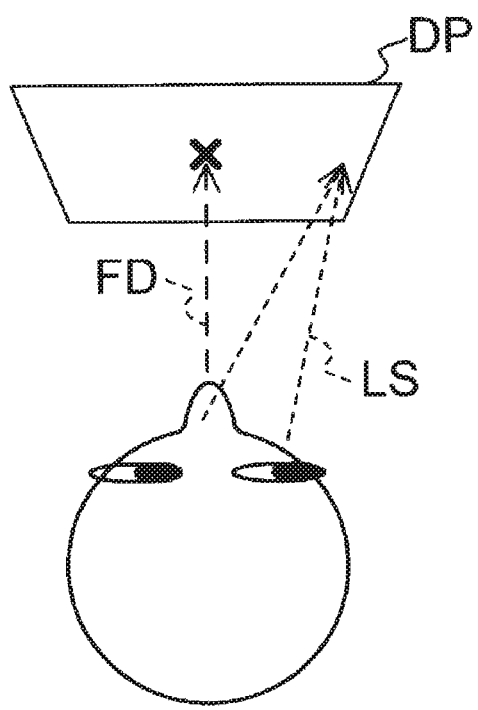
FIG. 7B schematically shows the relationship between the gaze direction of the user, the direction of the user's face, and the position of the display.
Figure 7C:
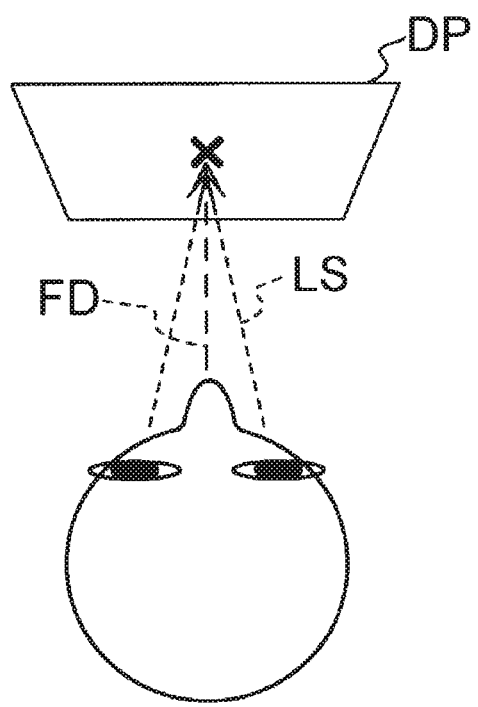
FIG. 7C schematically shows the relationship between the gaze direction of the user, the direction of the user's face, and the position of the display.

FIGS. 7A to 7C schematically show the relationship between the direction FD of the user's face and the gaze direction LS. As shown in FIG. 7A, the user can face the screen such that the direction FD of the user's face is towards the left portion of the screen of the display DP while the user's gaze direction LS is towards the center of the screen of the display DP, for example. Also as shown in FIG. 7B, the user can face the screen such that the direction FD of the user's face is towards the center of the screen of the display DP while the user's gaze direction LS is towards the right portion of the screen of the display DP, for example. Besides this, as shown in FIG. 7C, the direction FD of the user's face and the gaze direction LS may be the same direction (towards the center of the screen of the display DP, for example).

Also, in the motion operation device 100 of the present embodiment, the direction of the face is detected using information such as the edges of the eyes, the brow, the temples, and the side edges of the face. Because the direction of the face is detected without using information such as the tip of the nose, the mouth, the upper forehead, or the chin, the motion operation device 100 can detect the direction of the face even if the user is wearing a mask, a hat, or the like. In other words, according to one embodiment, the iris and pupil of the user's eyes may move without being detected, or without resulting in an operation of the motion operation device 100 to move a cursor on a display. Likewise, the iris and pupil of the user's eyes may remain stationary (or may maintain a facing direction) and the user's head may move, which would result in an operation of the motion operation device 100 to move the cursor on the display.

The present invention is not limited to the embodiments above. In the above embodiment, an example was described in which, when detecting the direction of a plurality of persons' faces, for example, a message prompting execution of a prescribed motion in order to identify the operator is displayed. However, a voice message prompting execution of the prescribed motion may be outputted by a voice output unit (not shown) provided in a gaming device or the like equipped with the motion operation device 100.

Also, a configuration may be adopted in which a frame to limit the operator is provided within the image captured by the camera CA, and operation information OI is generated only for the face of a person inside the frame and activated for operation output. In such a case, with the user's face located in a position close to the center of the frame as the starting point, for example, operations based on changes in the direction of the face may be started.

Also, in the above embodiment, an example was described in which the edges of the eyes, the brow, the temples, and the side edges of the face are detected in the eye periphery recognition process (S13). However, not all of these need be detected, and a configuration may be adopted in which one or more of the following are detected: the edges of the eyes, the brow, the temples, and the side edges of the face. The portions to be detected need not be limited to these portions, and a configuration may be adopted in which any portion constituting the contour surrounding the eyes (portion of the face surrounding the eyes other than the pupils) is detected.

Also, calibration may be performed prior to the face candidate recognition process and the eye recognition process. During calibration, a message or the like prompting the user to wait at a position close to the front of the display DP is displayed in the screen of the display DP and a facial image of the user is captured in advance, for example, and then, reference information such as the position of the face and the position of the eyes is attained. By executing the face candidate recognition process and the eye recognition process with reference to this reference information, it is possible for the hardware processing unit to smoothly execute the series of processes.

In the above embodiment, an example was described in which each of the logic circuits constituting the logic circuit units 21 (21A and 21B) reads data stored in the memory by the immediately preceding logic circuit (that is, operation result data by the immediately preceding logic circuit), and a matrix operation is performed on the data. However, the configuration is not limited thereto, and instead, each logic circuit may read data stored in the memory by a logic circuit two or more steps prior thereto (that is, operation result data by the logic circuit two or more steps prior), with a matrix operation being performed on the data. Also, a configuration may be adopted in which a matrix operation is performed on the basis of data read from a plurality of memories.

In the above embodiment, an example was described of a case in which data (coordinate plane information) read from the reference memories (24, 26) by the coordinate conversion logic circuits (23, 25) is used to generate the coordinate position information CD1 and CD2, while other logic circuits (second logic circuit 21-2 to nth logic circuit 21-n, for example) do not use the reference memories and instead read data stored in the memory by a previous logic circuit and perform a matrix operation on the data. However, a configuration may be adopted in which data read from memories similar to the reference memories (24, 26) (that is, memories to which data is not written by logic circuits) is used by logic circuits other than the coordinate conversion logic circuits (23, 25) to perform a matrix operation.

A configuration may be adopted in which the reference memories 24 and 26 do not have data written thereto by logic circuits, but rewriting thereto by external access is enabled. For example, although the hardware processing unit 20 executes only specific processes, some of the parameters or the like used for those specific processes can be modified by rewriting of the reference memories by an external source.

In the above embodiment, an example was described in which generation of the face direction vector FV and the face direction position information FP is performed by the software processing unit. However, these processes may be executed by hardware. In other words, in the motion operation device of the present invention, at least the face detection process (face candidate recognition process, eye recognition process, eye periphery recognition process, eye periphery 2D coordinate conversion process, and eye 2D coordinate conversion process), which is based on image data, may be executed by the hardware processing unit, while other processes may be executed by software or hardware.

DESCRIPTION OF REFERENCE CHARACTERS

- 10 image sensor
- 11 image processing unit
- 12 operation information generation unit
- 20 hardware processing unit
- 21 logic circuit unit
- 22 memory unit
- 30 software processing unit
- 31 face direction vector generation unit
- 32 2D face direction position conversion unit
- 40 display control unit

What is claimed is:

1. An operation determination device that determines a change in a facing direction of a face of a user as a contact-free operation on a display image, the operation determination device comprising:
an image sensor that acquires a captured image of the face of the user;
an image processor that performs image processing on the captured image and generates information regarding the facing direction of the face of the user, and
a display controller that generates operation information for performing contact-free operation on the display image on the basis of the information regarding the facing direction of the face of the user generated by the image processor,
wherein the image processor includes:
a first processor that detects a portion of the face of the user in the captured image; and
a second processor that determines the facing direction of the face of the user in relation to a display surface that displays the display image, and determines a distance from the image sensor to the face of the user, on the basis of the portion of the face of the user detected in the captured image, the second processing unit generating, as the information regarding the facing direction of the face of the user, information indicating a position on the display surface corresponding to a direction of the face of the user on the basis of the facing direction of the face of the user and the distance to the face of the user; and
wherein the display controller determines whether or not the face of the user is within a prescribed distance range of the display surface on the basis of a distance between eyes of the user, and generates the operation information in response to determining that the face of the user is within the prescribed distance range; and
wherein the second processor estimates a distance from the display surface on the basis of coordinate information of an eye periphery and coordinate information of the eyes supplied by the first processor, estimates a size of the face of the user on the basis of a distance between pupils of the eyes and a distance between edges of the eyes, calculates the distance from the image sensor to the face of the user on the basis of the estimated size of the face of the user, and uses the calculated distance as an estimate of a distance from the display surface to the face of the user.

2. The operation determination device according to claim 1,
wherein the first processor includes a plurality of logic circuits that sequentially execute a matrix operation on the captured image, and
wherein the portion of the face of the user in the captured image is detected on the basis of operation results of the matrix operation by the plurality of logic circuits.

3. The operation determination device according to claim 2,
wherein the first processor detects a position and shape of a contour that surrounds the eyes of the user as the portion of the face.

4. The operation determination device according to claim 3,
wherein the first processor converts the position of the contour that surrounds the eyes of the user in the captured image into position coordinates in a two-dimensional coordinate plane, and
wherein the second processor determines the facing direction of the face of the user in relation to the display surface on the basis of the position coordinates.

5. The operation determination device according to claim 2,
wherein the first processor includes a plurality of memories, each of which stores operation results of the matrix operations by the plurality of logic circuits, and
wherein each of the plurality of logic circuits executes the matrix operations on the basis of data read from a corresponding memory among the plurality of memories.

6. The operation determination device according to claim 1, wherein the first processor detects a position and shape of a contour that surrounds the eyes of the user as the portion of the face.

7. The operation determination device according to claim 1,
wherein the first processor detects at least one of the edges of the eyes, a brow, temples, and side edges of the face of the user as the portion of the face.

8. The operation determination device according to claim 7, wherein the portion of the face detected by the first processor excludes the eyeball and portions of the face that do not surround the eyes.

9. The operation determination device according to claim 1, wherein, when a plurality of persons are present in the captured image, the first processor detects a portion of a face of each of the plurality of persons.

10. The operation determination device according to claim 9, wherein, when a plurality of persons are present in the captured image, the second processor generates information regarding a facing direction of a face of each of the plurality of persons.

11. The operation determination device according to claim 10, wherein, when a plurality of persons are present in the captured image, the display controller identifies a person who performs a prescribed movement as an operator, and generates the operation information based on information regarding a facing direction of a face of the operator.

12. The operation determination device according to claim 11, wherein, when a plurality of persons are present in the captured image, the display controller controls the display surface to display a message prompting the prescribed movement.

13. The operation determination device according to claim 1, wherein the first processor is constituted of hardware that executes a specific detection process, and includes a logic circuit and a memory.

14. The operation determination device according to claim 1, wherein the second processor includes a CPU, and executes a process according to a program based on an output of the first processor.

15. An operation determination method to be performed in an operation determination device that determines a change in a facing direction of a face of a user as a contact-free operation on a display image, the method comprising:
- a step of acquiring a captured image of the face of the user;
- a step of performing image processing on the captured image and generating information regarding the facing direction of the face of the user;
- a step of generating operation information for performing contact-free operation on the display image on the basis of the information regarding the facing direction of the face of the user;
- a step of detecting a portion of the face of the user in the captured image using hardware that executes specific detection processes;
- a step of determining by software the facing direction of the face of the user in relation to a display surface that displays the display image, and determining a distance from an image sensor to the face of the user, on the basis of the portion of the face of the user detected in the captured image; and
- generating, as the information regarding the facing direction of the face of the user, information indicating a position on the display surface corresponding to a direction of the face of the user on the basis of the facing direction of the face of the user and the distance to the face of the user;
- wherein the step of generating the operation information includes determining whether or not the face of the user is within a prescribed distance range of the display surface on the basis of a distance between eyes of the user, and generating the operation information in response to determining that the face of the user is within the prescribed distance range; and
- wherein the step of determining the distance from the image sensor to the face of the user includes estimating a distance from the display surface on the basis of coordinate information of an eye periphery and coordinate information of the eyes, estimating a size of the face of the user on the basis of a distance between pupils of the eyes and a distance between edges of the eyes, calculating the distance from the image sensor to the face of the user on the basis of the estimated size of the face of the user, and using the calculated distance as an estimate of a distance from the display surface to the face of the user.

16. The operation determination method according to claim 15,
wherein the step of detecting the portion of the face of the user in the captured image includes:
- a step of sequentially executing matrix operations on the captured image by a plurality of logic circuits included in the hardware; and
- a step of converting a position of the portion of the face of the user in the captured image into position coordinates in a two-dimensional coordinate plane.

17. The operation determination method according to claim 16,
wherein a position and shape of a contour that surrounds the eyes of the user is detected as the portion of the face.

* * * * *